(12) United States Patent
Larson

(10) Patent No.: US 7,101,297 B2
(45) Date of Patent: Sep. 5, 2006

(54) COMPACT ACTUATOR

(75) Inventor: Lowell V. Larson, Huntington Beach, CA (US)

(73) Assignee: Moog Inc., East Aurora, NY (US)

( * ) Notice: Subject to any disclaimer, the term of this patent is extended or adjusted under 35 U.S.C. 154(b) by 218 days.

(21) Appl. No.: 10/865,102

(22) Filed: Jun. 10, 2004

(65) Prior Publication Data

US 2005/0277513 A1    Dec. 15, 2005

(51) Int. Cl.
B64C 3/48 (2006.01)
(52) U.S. Cl. .............................. 475/4; 475/5; 475/331; 244/214; 244/215
(58) Field of Classification Search ................ 475/2–5, 475/331; 244/214, 215, 216; 74/29, 120, 74/42
See application file for complete search history.

(56) References Cited

U.S. PATENT DOCUMENTS 2,959,070 A * 11/1960 Flinn ........................... 74/664
4,305,488 A * 12/1981 McIntosh .................... 192/219
4,691,584 A *  9/1987 Takaishi et al. .......... 74/471 R

FOREIGN PATENT DOCUMENTS

JP    2003-166557    *  6/2003

* cited by examiner

Primary Examiner—Ha Ho
(74) Attorney, Agent, or Firm—Phillips Lytle LLP

(57) ABSTRACT

A compact actuator (20) is arranged to selectively move an airfoil surface (27) relative to a support (27) relative to a support (21). The actuator includes a gear reduction unit (24) mounted on the support. The gear reduction unit has a ring gear (25) adapted to be rotated about a longitudinal axis (x—x), and a pinion (26) mounted on the ring gear. All bearings for the pinion gear are physically located within the gear reduction unit. The pinion gear engages a rack (23) attached to the airfoil surface such that rotation of the pinion gear will move the airfoil surface relative to the support.

7 Claims, 3 Drawing Sheets

COMPACT ACTUATOR

TECHNICAL FIELD

The present invention relates generally to actuators and gear reduction mechanisms, and, more particularly, to an improved compact actuator in which a gear or pinion is concentric with a gear reduction mechanism, and is uniquely suited to moving a flap or slat relative to a wing on an aircraft.

BACKGROUND ART

In modern aircraft, it is common to have slats or flaps that may be selectively moved relative to the wing to vary the shape and configuration of the airfoil surface.

In some applications, a motor is operatively arranged to move the flap or slat via a ball screw mechanism. An example of such a ball screw-type mechanism is representatively shown and described in U.S. Pat. No. 4,995,575. However, more recently, efforts have been directed toward using a rack and pinion arrangement to move the flap or slat. In this arrangement, a gear drive mechanism has an outboard pinion (i.e., a non-concentric pinion that is connected to the output shaft of an actuator and that must be supported by is own bearings) that engages a curved rack mounted on the flat or slat. Thus, the driven gear reduction mechanism may be used to selectively rotate the pinion to extend or retract the flap or slat, has desired. Examples of these types of mechanisms are representatively shown and described in U.S. Pat. Nos. 1,917,428, 4,471,928, 4,838,503, 5,544,847 and 6,149,105.

The aggregate disclosures of each of the foregoing references are hereby incorporated by reference insofar as the structure and operation of such prior art mechanisms is concerned.

While these devices have been generally satisfactory in some aspects, they do require separate straddle-mounted bearings to support the pinion. This adds unnecessary weight, which is considered to be at a premium in aircraft applications.

It would, therefore, be generally desirable to provide an improved compact actuator that would afford the capability of providing a combined gear or pinion and a gear reduction mechanism of reduced weight. Such a mechanism would be of particular utility in aircraft applications.

DISCLOSURE OF THE INVENTION

With parenthetical reference to the corresponding parts, portions and surfaces of the disclosed embodiment, merely for purposes of illustration and not by way of limitation, the present invention broadly provides an improved compact actuator (20) for selectively moving an object (27) relative to a support (21). The improved actuator broadly includes: a gear reduction unit (24) mounted on the support, the gear reduction unit having a ring gear (25) adapted to be rotated about a longitudinal axis of the gear reduction unit; and an output member (26) mounted on the ring gear such that all bearings for the output member are physically located within the gear reduction unit. The output member is operatively coupled to the object such that rotation of the output member will move the object relative to the support.

The output member may be removably mounted on the ring gear, or may be integral therewith. The output member may be a gear (e.g., a pinion), a sprocket, a drive pulley, or the like. The gear reduction unit has a longitudinal centerline (x—x), and a transverse centerline. In the preferred embodiment, the transverse centerline (y—y) of the output member is substantially aligned and coincident with the transverse centerline of the gear reduction unit. The object may be a rack (23), either straight or curved, mounted on an airfoil surface, such as a flap or slat. In this form, the output member may be a pinion matingly engaged with such rack.

The gear reduction unit may have a sun gear (29) and at least one planet gear (30) engaging the sun gear. The ring gear may engage each planet gear. The gear reduction unit may be a simple or compound gear reduction mechanism. The sun gear may be driven by some external device, such as a motor located remotely from the device. In this form, power may be transmitted to the device via a shaft connected to the motor output. Alternatively, a motor may be physically arranged within the gear reduction unit such that the motor is operatively arranged to rotate the ring gear. In this form, a gear would be typically mounted on the output shaft of the motor to engage the ring gear, and provide a gear reduction mechanism.

The principal advantage of this invention is reduction in weight and size, as well as increased reliability and reduced cost.

Accordingly, the general object of the invention is to provide an improved compact actuator for general usage and application.

Another object is to provide an improved compact actuator which is uniquely adapted for use in an aircraft to selectively move an airfoil surface, such as a flap or slat, relative to a wing.

Still another object is to provide an improved compact actuator that results in having a more facile combination then heretofore available in the prior art.

These and other objects and advantages will become apparent from the foregoing and ongoing written specification, the drawings, and the appended claims.

DESCRIPTION OF THE PREFERRED EMBODIMENTS

Figure 1:
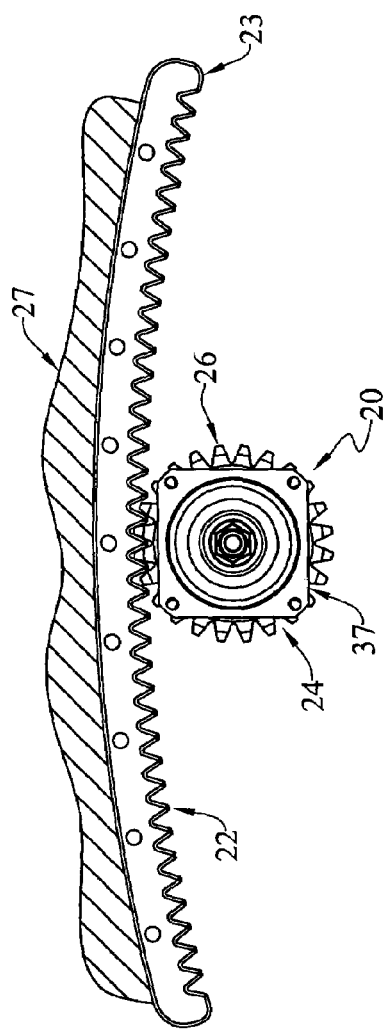
FIG. 1 is fragmentary vertical sectional view showing the improved compact actuator in end elevation in meshed engagement with a curved rack mounted on the underside of an airfoil surface.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 3:
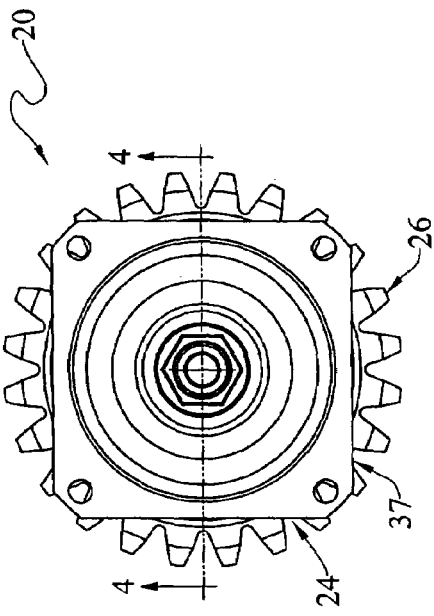
FIG. 3 is a right side elevation of the compact actuator shown in FIG. 2.
Figure 2:
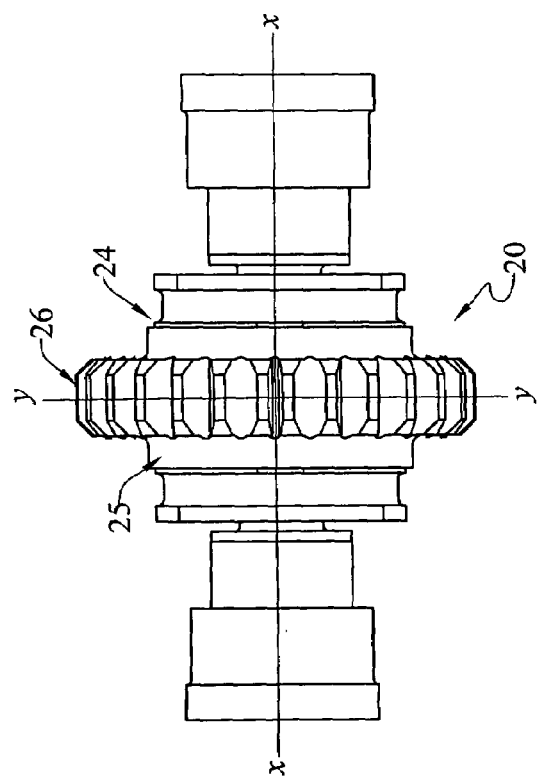
FIG. 2 is a side elevation of the compact actuator shown in FIG. 1, again with the mounting ribs removed.
Figure 4:
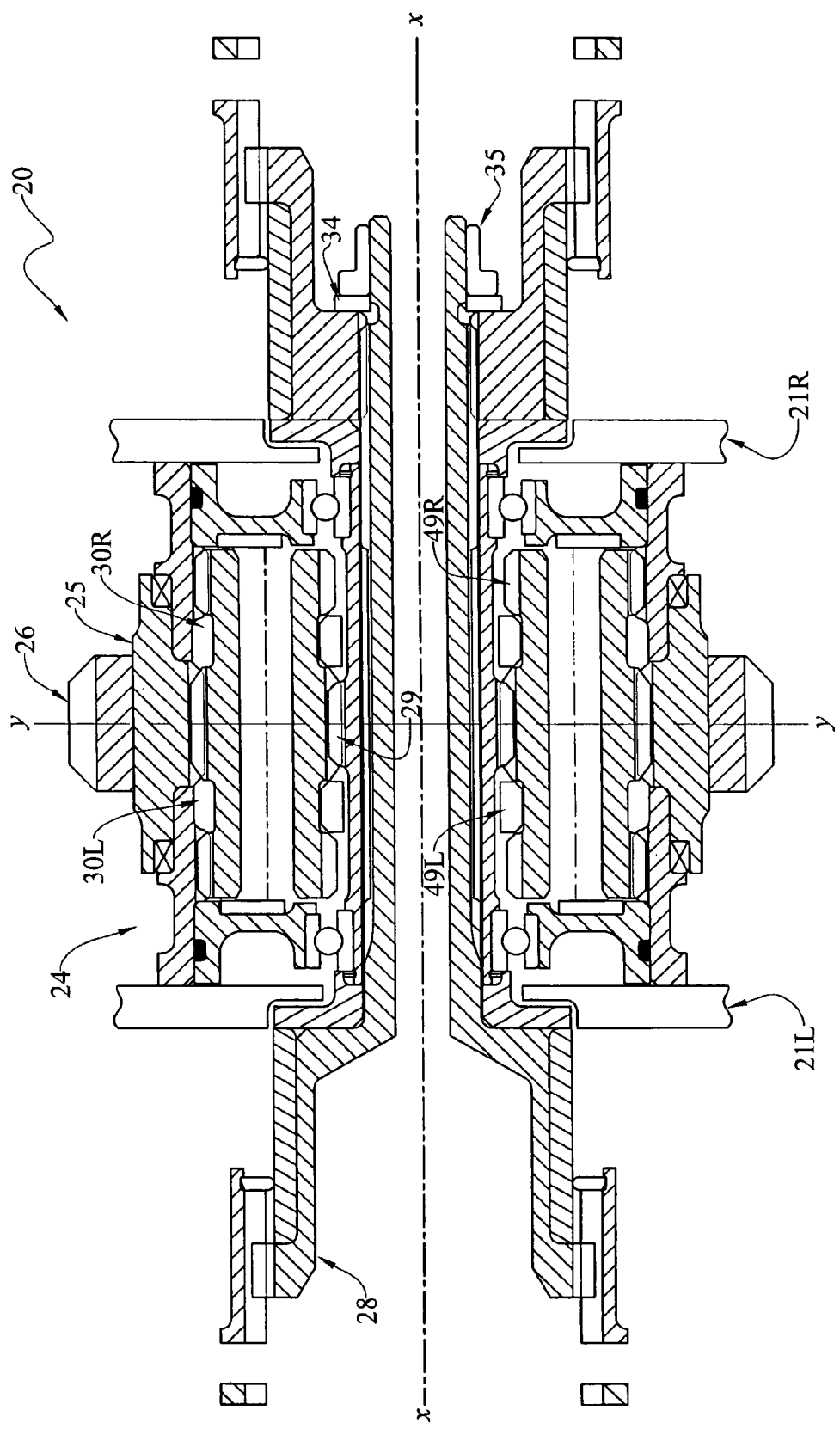
FIG. 4 is an enlarged fragmentary horizontal sectional view of the improved compact actuator, this view being taken generally on line 4—4 of FIG. 3.
Figure 7:
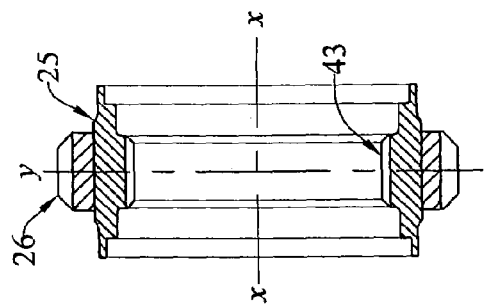
FIG. 7 is a reduced-scale view of the ring gear, with the integral pinion, shown in FIG. 4.
Figure 8:
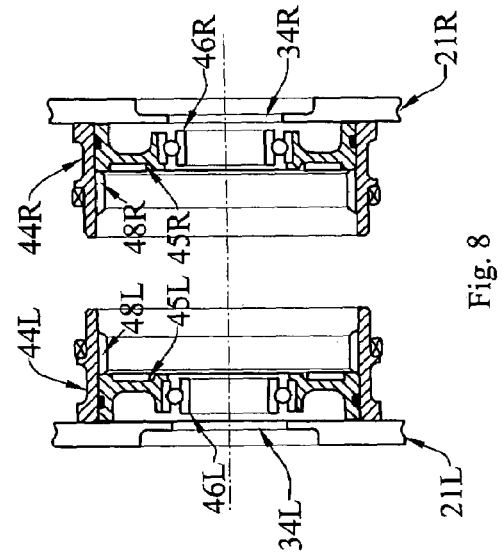
FIG. 8 is a reduced-scale view of the mounting ribs and associated structure shown in FIG. 4.

Referring now to the drawings, and, more particularly, to FIGS. 1–3 thereof, the present invention broadly provides an improved compact actuator, of which a presently-preferred embodiment is generally indicated at 20, that is adapted to be mounted on a support, fragmentary portions of which are indicated at 21 in FIGS. 4 and 8, for selectively moving an object 22 relative to the support. In FIG. 1, object 22 is specifically shown as being a curved rack 23, such as of the type used in the prior art to move a flap or slat relative to a wing in an aircraft. However, the object need not necessarily be a curved rack. The output member could be a gear (e.g., a pinion), a drive pulley, a sprocket, etc., and the object could be a straight rack, a gear train, a pulley or drive mechanism, a chain-type mechanism, or the like, as desired. While the preferred embodiment is shown as having an outer pinion in meshing engagement with the rack, this is only true of the illustrated and presently-preferred embodiment. In other arrangements, other motion-transfer mechanisms could be used.

In FIG. 1, curved rack 23 is shown as being mounted on the underside of an airfoil surface, such as a flap or slat, fragmentarily indicated at 27. Thus, as the actuator is rotated about its longitudinal axis x—x, the curved rack and airfoil will be moved relative to the support. Hence, this arrangement is useful in moving a flap or slat relative to a wing.

Referring now collectively to FIGS. 1–4, the improved actuator is shown as broadly including a gear reduction unit, generally indicated at 24 mounted on the support. The gear reduction unit has a ring gear 25 adapted to be rotated about the longitudinal axis x—x of the gear reduction unit. The improved actuator also includes an output member 26 mounted on the ring gear. In the illustrated embodiment, output member 26 is a pinion that is arranged to be placed in meshing engagement with the rack. However, as noted above, the output member could simply be a gear, a sprocket, a drive pulley, or some other mechanism, that is operatively coupled to move the object relative to the support. Thus, the output member should not be construed as being limited to the specific pinion shown in the accompanying drawings.

One unique feature of the invention is that, unlike the prior art arrangements, where the bearings for the pinion where located outwardly of the gear reduction mechanism, in the present invention, all bearings for the pinion are physically located within the gear reduction unit. Otherwise stated, since the pinion is mounted on the ring gear, there is no need for additional bearings to support the pinion. Rather, the pinion shares usage of the bearings already present in the gear reduction unit.

Referring now to FIG. 4, the gear reduction mechanism is shown as having a through-shaft, generally indicated at 28, that is adapted to be connected to other structure and that is adapted to be selectively rotated relative to the support about axis x—x. A sun gear, generally indicted at 29, is mounted on the through-shaft. A plurality of planet gears, severally indicted at 30, are in meshed engagement with the sun gear, and surround the sun gear. These planet gears are also in meshing engagement with ring gear 25. The pinion 26 may be movably mounted on ring gear 25, such as by means of a key-keyway connection (not shown), or the like. In the preferred form, the axis of pinion 26 is concentric with the axis of ring gear 25.

Figure 6:
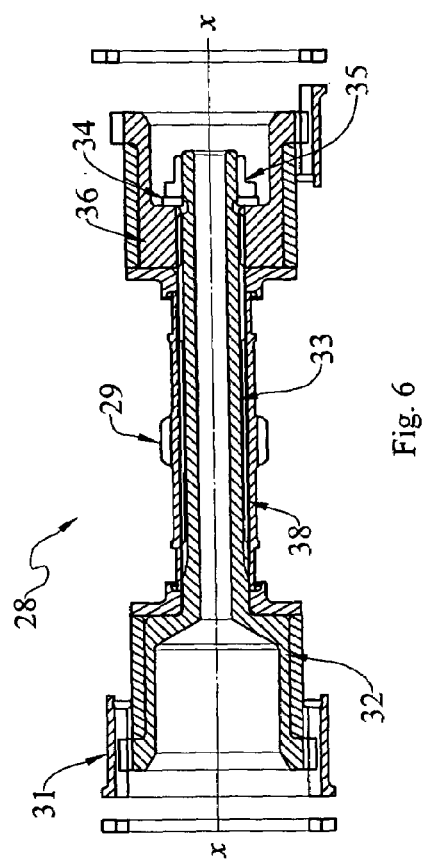
FIG. 6 is a reduced-scale view of the feed-through torque tube shown in FIG. 4.

Referring now to FIG. 6, a coupling sleeve 31 is shown as having a splined connection with the left end of through-shaft 28. The through-shaft has a leftward radially-enlarged portion, generally indicated at 32, and a rightward narrowed portion 33 that is adapted to pass through openings 34 in the ribs or support 21. The right marginal end portion of the through-shaft is threaded to receive a washer 34 and nut 35. The left face of washer 34 bears against a coupling seal 36. Thus, during assembly, the gear reduction mechanism is placed between the two ribs or supports, and the reduced-diameter portion 33 of the coupling shaft is passed through aligned rib openings 34, 34. Once in this position, coupling seal 36 is slipped over the right marginal end portion of the through-shaft, and the nut and washer are applied to hold the assembly together. As the penetrant reduced-diameter portion of the through-shaft 33 is slipped through the openings, certain teeth on the coupling shaft engage the inwardly-recesses on the sun gear to complete a splined connection 38 therebetween. Thus, sun gear 29 rotates with the through-shaft.

Figure 5:
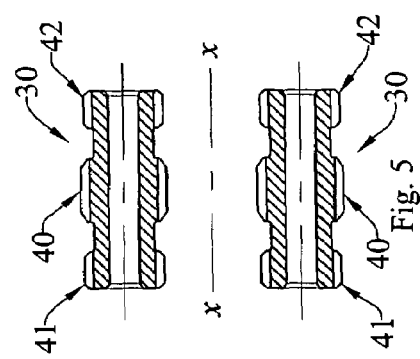
FIG. 5 is a reduced-scale view of two of the planetary gears shown in FIG. 4.

As best shown in FIG. 5, each planet gear is a horizontally-elongated tubular member having leftward outer teeth 41, intermediate outer teeth 40, and rightward outer teeth 42. Central teeth 40 are adapted to mesh with inwardly-facing gear teeth 43 on ring gear 25. As previously noted, in the preferred embodiment, the pinion is removably mounted on the ring gear as by means of a key-key way connection (not shown), or the like. Thus, the outer pinion rotates with the ring gear.

As best shown in FIG. 8, support structures 44L and 44R extend toward one another from the left and right ribs, respectively. These support structures have inwardly-extending portions 45L and 45R to support their inner end bearings 46L and 46R. These bearings journal the sun gear and through-shaft subassembly on the support. Supports 44L and 44R have inner teeth 48L and 48R that matingly engage pinion teeth 41, 42, respectively. Spacers 49L and 49R are operatively arranged to maintain the desired spacing.

The device as assembled is generally shown in FIG. 4. Through-shaft 28 is selectively rotated in the appropriate angular direction by another mechanism (not shown). As the through-shaft is rotated, it also rotates the sun gear. This causes rotation of the planet gear, and rotation of the outer ring gear and pinion. Thus, as the through-shaft rotates one complete revolution, the ring gear and pinion rotate a fraction of a revolution, and cause a corresponding movement of rack 23 along the track (not shown) in which it is mounted to selectively extend or retract the flap, depending on the direction of rotation.

As previously noted, unlike prior arrangements in which the pinion was mounted on one end of a gear reduction unit, in the present arrangement, the centerline of the pinion is coincident with the transverse centerline (y—y) of the gear reduction unit. Hence, the pinion is mounted on the ring gear, there is no need to provide additional bearings to support the pinion. Rather, the pinion is supported and carried by the bearings of the gear-reduction unit.

Another unique feature is the manner by which the improved compact actuator is mounted on the supporting structure. As indicated, the through-shaft is removable to allow the mechanism to be physically placed between the two support ribs 21L, 21R and be secured in this position by suitable means, such as mounting flange 37 (FIGS. 1 and 3). Thereafter, the reduced-diameter portion of the through-shaft may be passed through the sun gear and through the openings 34, 34 on the two ribs. After this has been accomplished, the coupling seal may be slipped over the right end of the reduced-diameter portion 33, and the assembly may be secured by means of the nut and washer mounted on the right marginal end portion of member 33. To remove the device, the nut and washer are removed, and the through-shaft is withdrawn. Once withdrawn, the gear reduction mechanism and pinion maybe physically removed from the space between the two ribs.

In an alternative arrangement, the improved mechanism might simply be bolted onto one of the ribs. Which type of mechanism is used depends entirely on the configuration of the various parts and components.

Therefore, in summary, the present invention broadly provides and improved compact actuator for selectively moving an object relative to a support. The improved actuator broadly includes a gear reduction unit mounted on the support, the gear reduction unit having a ring gear adapted to be rotated about a longitudinal axis; and an output member, such as pinion 26, mounted on the ring gear such that all bearings for the output member are physically located within the gear reduction unit, the output member being operatively coupled to the object such that rotation of the output member will move the object relative to the support. As indicated above, the output member may be a pinion. However, it may simply be a gear that is adapted to mesh with some other gear train, a sprocket, a drive pulley, or some other mechanism.

Therefore, while the presently-preferred form of the improved compact actuator has been shown and described, and several modifications thereof discussed, persons skilled in this art will readily appreciate that various additional changes and modifications may be made without departing from the spirit of the invention, as defined and differentiated by the following claims.

What is claimed is:

1. A compact actuator for selectively moving a rack mounted on an airfoil surface relative to a support, comprising:
   a gear reduction unit mounted on said support, said gear reduction unit having a ring gear adapted to be rotated about a longitudinal axis; and
   a pinion mounted on said ring gear such that all bearings for said pinion are located within said gear reduction unit, said pinion being operatively engaged with said rack such that rotation of said pinion will move said airfoil surface relative to said support.

2. A compact actuator as set forth in claim 1 wherein said pinion is removably mounted on said ring gear.

3. A compact actuator as set forth in claim 1 wherein said gear reduction unit has a transverse centerline, and wherein the transverse centerline of said pinion is substantially aligned with the transverse centerline of said gear reduction unit.

4. A compact actuator as set forth in claim 1 wherein said airfoil surface is a flap or slat.

5. A compact actuator as set forth in claim 1 wherein said gear reduction unit has a sun gear, at least one planet gear engaging said sun gear, and wherein said ring gear engages each planet gear.

6. A compact actuator as set forth in claim 5 and further comprising means for rotating said sun gear.

7. A compact actuator as set forth in claim 1 wherein a motor is operatively arranged within said gear reduction unit, and wherein said motor is arranged to selectively rotate said ring gear.

* * * * *